(12) United States Patent
Takeda et al.

(10) Patent No.: US 8,869,554 B2
(45) Date of Patent: Oct. 28, 2014

(54) GAS PROCESSING APPARATUS

(75) Inventors: Kazuhiro Takeda, Minato-ku (JP);
Yosuke Nakagawa, Minato-ku (JP);
Tomoaki Takeda, Minato-ku (JP);
Yasushi Mori, Minato-ku (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 370 days.

(21) Appl. No.: 13/265,013

(22) PCT Filed: Sep. 9, 2010

(86) PCT No.: PCT/JP2010/065466
§ 371 (c)(1),
(2), (4) Date: Dec. 6, 2011

(87) PCT Pub. No.: WO2011/040198
PCT Pub. Date: Apr. 7, 2011

(65) Prior Publication Data
US 2012/0067071 A1   Mar. 22, 2012

(30) Foreign Application Priority Data

Sep. 30, 2009 (JP) .................................. 2009-227020

(51) Int. Cl.
*F25J 3/00* (2006.01)
*F04B 49/06* (2006.01)

(52) U.S. Cl.
CPC . *F04B 49/06* (2013.01); *Y02E 60/34* (2013.01)
USPC .......................................... 62/657; 62/196.1

(58) Field of Classification Search
CPC ......... F25J 1/007; F25J 1/0201; F25J 1/0287; F25J 1/0288; F25J 2230/20; F25J 2270/04; F25J 1/0237; F25J 1/0254; F25J 1/0298; F25B 9/06; F25B 11/00; F25B 11/02; F04D 27/02; F04D 27/0207

USPC ............... 62/401, 402, 86, 87, 172, 197, 216, 62/196.1, 657

See application file for complete search history.

(56) References Cited

U.S. PATENT DOCUMENTS 3,321,930 A * 5/1967 La Fleur ....................... 62/228.4
3,992,891 A * 11/1976 Pocrnja .......................... 62/50.3

(Continued)

FOREIGN PATENT DOCUMENTS

| CN | 101535741 | 9/2009 |
|---|---|---|
| JP | 50-142465 | 11/1975 |

(Continued)

OTHER PUBLICATIONS

Chinese Office Action issued May 30, 2013 in corresponding Chinese Patent Application No. 201080019844.0 with English translation.

(Continued)

*Primary Examiner* — Allana Lewin
*Assistant Examiner* — Kun Kai Ma
(74) *Attorney, Agent, or Firm* — Wenderoth, Lind & Ponack, LLP.

(57) ABSTRACT

Gas treatment equipment includes a compressor which compresses process gas, a first process module which is disposed downstream of the compressor and which treats the process gas, an expander which is disposed downstream of the first process module and which expands the process gas to obtain power, a second process module which is disposed downstream of the expander and which treats the process gas, and a driver which drives the compressor. A first pressure indicator is disposed at an inlet of the compressor for the process gas and measures a pressure of the process gas, and a second pressure indicator is disposed at an outlet of the second process module for the process gas and measures a pressure of the process gas. A recirculation flow path is connected to both of the outlet of the second process module for the process gas and the inlet of the compressor.

2 Claims, 9 Drawing Sheets

(56) References Cited

U.S. PATENT DOCUMENTS

| | | | | |
|---|---|---|---|---|
| 4,163,365 | A * | 8/1979 | Frutschi | 60/773 |
| 4,356,014 | A * | 10/1982 | Higgins | 62/622 |
| 4,539,816 | A * | 9/1985 | Fox | 62/87 |
| 4,949,276 | A | 8/1990 | Staroselsky et al. | |
| 6,332,336 | B1 | 12/2001 | Mirsky et al. | |
| 6,626,635 | B1 * | 9/2003 | Prowse et al. | 415/1 |
| 2006/0101824 | A1 * | 5/2006 | Takeda et al. | 60/727 |
| 2007/0110587 | A1 * | 5/2007 | Takeshita | 417/26 |
| 2008/0148770 | A1 * | 6/2008 | Migliore et al. | 62/612 |
| 2009/0126377 | A1 * | 5/2009 | Shibata et al. | 62/87 |
| 2009/0165456 | A1 * | 7/2009 | Masada | 60/531 |
| 2009/0204305 | A1 * | 8/2009 | Ishibashi et al. | 701/100 |

FOREIGN PATENT DOCUMENTS

| | | |
|---|---|---|
| JP | 11-132055 | 5/1999 |
| RU | 2176053 | 11/2001 |
| RU | 2 339 871 | 11/2008 |
| SU | 838273 | 2/1979 |

OTHER PUBLICATIONS

International Search Report issued Dec. 7, 2010 in International (PCT) Application No. PCT/JP2010/065466 w/partial translation.

Written Opinion of the International Searching Authority issued Dec. 7, 2010 in International (PCT) Application No. PCT/JP2010/065466 w/partial translation.

Russian Decision on Grant issued Mar. 26, 2013 in corresponding Russian Patent Application No. 2011144866 with English Translation.

* cited by examiner

GAS PROCESSING APPARATUS

TECHNICAL FIELD

The present application relates to gas treatment equipment.

BACKGROUND ART

As a system configuration of gas treatment equipment including a freezing compressor, a closed cycle system has heretofore been known which operates while circulating refrigerant gas. In a closed cycle system disclosed, for example, in the following Patent Literature 1 <in particular, see FIG. 1 of the following Patent Literature 1>, an expander is placed downstream of a compressor, and refrigerant gas discharged from a refrigerant gas outlet of the expander is returned to a refrigerant gas inlet of the compressor, and thus is recirculated. Accordingly, the closed system is always in a state in which the pressure at the refrigerant gas outlet of the expander is higher than the pressure at the refrigerant gas inlet of the compressor, and never operates in a state in which the pressure at the refrigerant gas outlet of the expander is lower than the pressure at the refrigerant gas inlet of the compressor.

PRIOR ART DOCUMENTS

Patent Document

Patent Document 1 US Patent Application Publication 2008/0148770

SUMMARY OF THE INVENTION

Problems to be Solved by the Invention

Meanwhile, the above-described conventional closed cycle system operates using dedicated refrigerant gas such as nitrogen. However, for the purpose of making improvements such as an increase in the process efficiency and the simplification of the structure of gas treatment equipment, the equipment may preferably have a configuration capable of treating process gas while using the process gas as refrigerant gas. For this occasion, the equipment employs a system configuration of an open cycle system, and uses as refrigerant gas the process gas from an upstream facility. In this case, the flow rate of the process gas varies depending on a factor such as the state of the upstream facility which is a supply source of the process gas.

Accordingly, in the case where the open cycle system uses the process gas as the refrigerant gas, a decrease in the flow rate of the process gas supplied from the upstream facility causes a decrease in the flow rate of the process gas supplied to the compressor, and also causes a decrease in the flow rate of the process gas flowing out from the outlet of the expander.

Further, with the decrease in the flow rate of the process gas supplied to the compressor, a compressor operating point moves into a surge zone. In this case, for surge prevention, the compressor portion may be operated by recycling the process gas only in the compressor portion. However, since the flow rate of the gas in a process portion including the expander portion decreases, the load in the process portion decreases so much that the gas treatment equipment cannot operate any more.

In view of the above, an object of the present invention is to provide gas treatment equipment capable of operating regardless of the flow rate of supplied process gas.

Means for Solving the Problems

Gas treatment equipment according to a first aspect of the present invention which addresses the above-described problem includes: a compressor which compresses process gas; a first process module which is disposed downstream of the compressor and which treats the process gas; an expander which is disposed downstream of the first process module and which expands the process gas to obtain power; a second process module which is disposed downstream of the expander and which treats the process gas; drive means which drives the compressor; a first pressure indicator which is disposed at an inlet of the compressor for the process gas and which measures a pressure of the process gas; a second pressure indicator which is disposed at an outlet of the second process module for the process gas and which measures a pressure of the process gas; a recirculation flow path which is connected to both of the outlet of the second process module for the process gas and the inlet of the compressor for the process gas and which recirculates the process gas; a first pressure control valve which is disposed in the recirculation flow path and which regulates the pressure of the process gas to be recirculated; a second pressure control valve which is disposed downstream of the second pressure indicator and which regulates the pressure of the process gas; a speed indicator which measures rotation speed of the drive means; and control means which controls at least one of the rotation speed of the drive means and the first and second pressure control valves on the basis of the pressures measured by the first and second pressure indicators and the rotation speed measured by the speed indicator.

Gas treatment equipment according to a second aspect of the present invention which addresses the above-described problem further includes: a process gas outlet flow path which is connected between the outlet of the second process module for the process gas and the second pressure control valve; a third pressure indicator which is disposed in the process gas outlet flow path and which measures the pressure of the process gas; and a third pressure control valve which is disposed upstream of the third pressure indicator in the process gas outlet flow path and which regulates the pressure of the process gas. In the gas treatment equipment, the control means controls the third pressure control valve on the basis of the pressure measured by the third pressure indicator.

Effects of the Invention

The present invention makes it possible to provide gas treatment equipment which can be operated regardless of the flow rate of supplied process gas.

MODE FOR CARRYING OUT THE INVENTION

Hereinafter, modes for implementing gas treatment equipment according to the present invention will be described with reference to the accompanying drawings.

Embodiment 1

Hereinafter, a first example of gas treatment equipment according to the present invention will be described.

First, the configuration of the gas treatment equipment according to the first example of the present invention will be described.

It should be noted that a facility serving as a supply source of process gas is located upstream of the gas treatment equipment according to this example, and that a facility using the treated process gas is located downstream thereof. However, they will not be described here. Moreover, the process gas may be, for example, a mixed gas including nitrogen, hydrogen and carbon dioxide.

Figure 1:
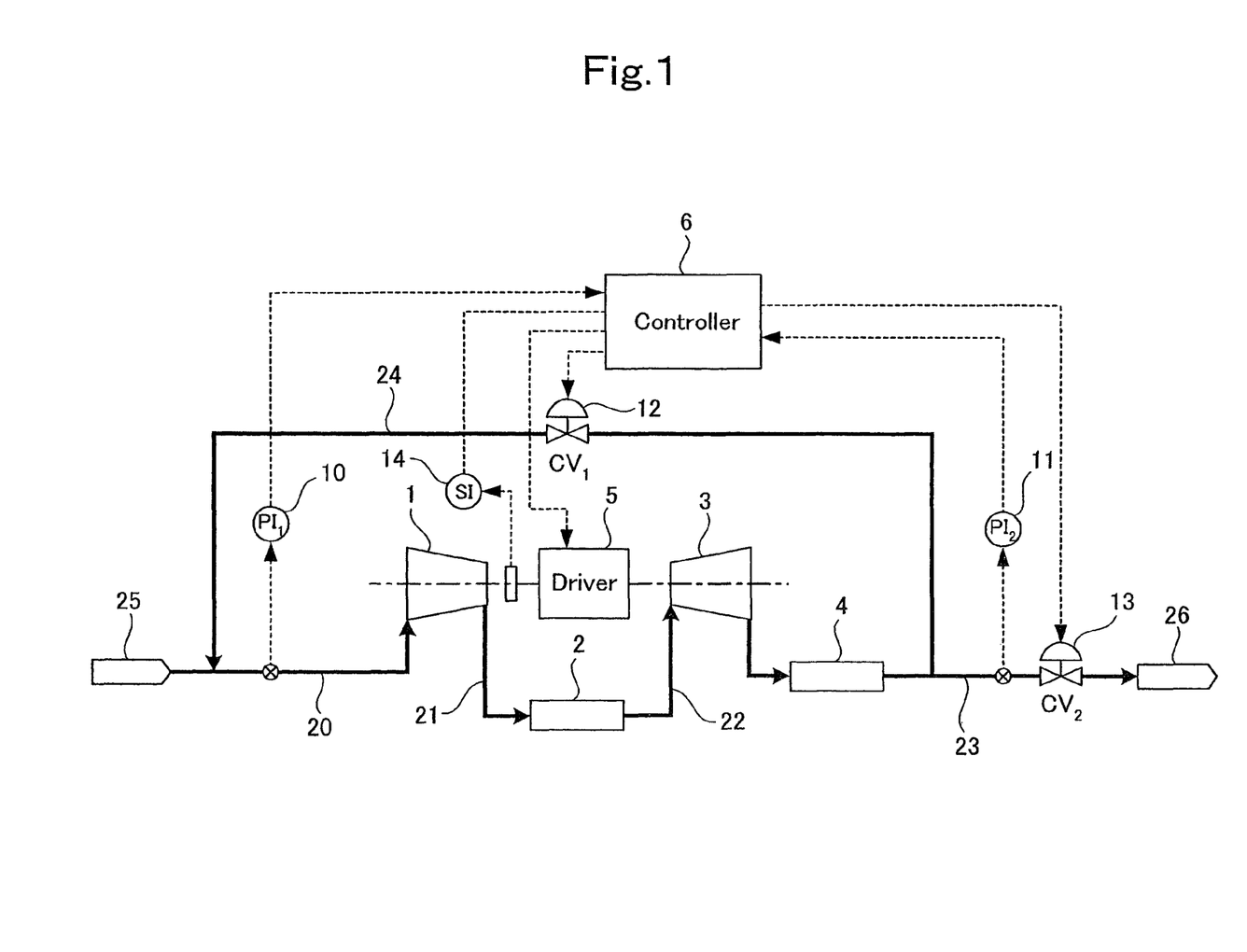
FIG. 1 is a schematic diagram showing the configuration of gas treatment equipment according to a first example of the present invention.

FIG. 1 is a schematic diagram showing the configuration of the gas treatment equipment according to the first example of the present invention.

As shown in FIG. 1, the gas treatment equipment according to the present embodiment includes a compressor 1 for compressing the process gas supplied from the upstream facility. Downstream of the compressor 1, a first process module 2 is provided to treat the process gas compressed by the compressor 1. Downstream of the first process module 2, an expander 3 is provided to expand the process gas and thus obtain power. Downstream of the expander 3, a second process module 4 is provided to treat the process gas expanded by the expander 3. The gas treatment equipment according to this example further includes a driver 5 for driving the compressor 1.

A first flow path 20 which is a flow path for the process gas is connected to a process gas inlet of the compressor 1. At an end portion of the first flow path 20, a process gas inlet 25 is placed which is a joint with the upstream facility serving as the supply source of the process gas. Between a process gas outlet of the compressor 1 and a process gas inlet of the first process module 2, a second flow path 21 is placed.

Between a process gas outlet of the first process module 2 and a process gas inlet of the expander 3, a third flow path 22 is placed. To a process gas outlet of the expander 3, a fourth flow path 23 is connected. At an end portion of the fourth flow path 23, a first process gas outlet 26 is placed which is a joint with a downstream facility using the treated process gas.

In the first flow path 20, a first pressure indicator ($PI_1$) 10 is placed to measure the pressure at the process gas inlet of the compressor 1. In the fourth flow path 23, a second pressure indicator ($PI_2$) 11 is placed to measure the pressure at the process gas outlet of the second process module 4. Moreover, a recirculation flow path 24 for recirculating the process gas is placed from a point between the process gas outlet of the second process module 4 and the second pressure indicator 11 to a point between the process gas inlet 25 and the first pressure indicator 10.

In the recirculation flow path 24, a first pressure control valve ($CV_1$) 12 is placed to regulate the pressure of the process gas being recirculated. Between the second pressure indicator 11 in the fourth flow path 23 and the first process gas outlet 26, a second pressure control valve ($CV_2$) 13 is placed to regulate the pressure of the process gas. On a rotary shaft of the driver 5, a speed indicator (SI) 14 is installed to measure the rotation speed thereof.

The gas treatment equipment according to this example includes a controller 6 which controls at least one of the rotation speed of the driver 5 and the first and second pressure control valves 12 and 13 based on the pressures measured by the first and second pressure indicators 10 and 11 and the rotation speed measured by the speed indicator 14. It should be noted that, although this example includes a description of a configuration in which the controller 6 controls the rotation speed of the driver 5, the controller 6 may control the angles of inlet guide vanes of the compressor 1.

In the case where the flow rate of the process gas supplied from the upstream facility is high, the controller 6 of the gas treatment equipment according to this example can increase the amount of collected power in the expander 3 by increasing the degree of opening of the second pressure control valve 13. On the other hand, in the case where the flow rate of the process gas supplied from the upstream facility is low and where process gas to be recirculated cannot be obtained, the controller 6 can decrease the power in the entire gas treatment equipment by decreasing the pressure at the process gas outlet of the first process module and obtaining power from the expander 3.

Next, a method of controlling the gas treatment equipment according to this example will be described in detail.

Figure 2:
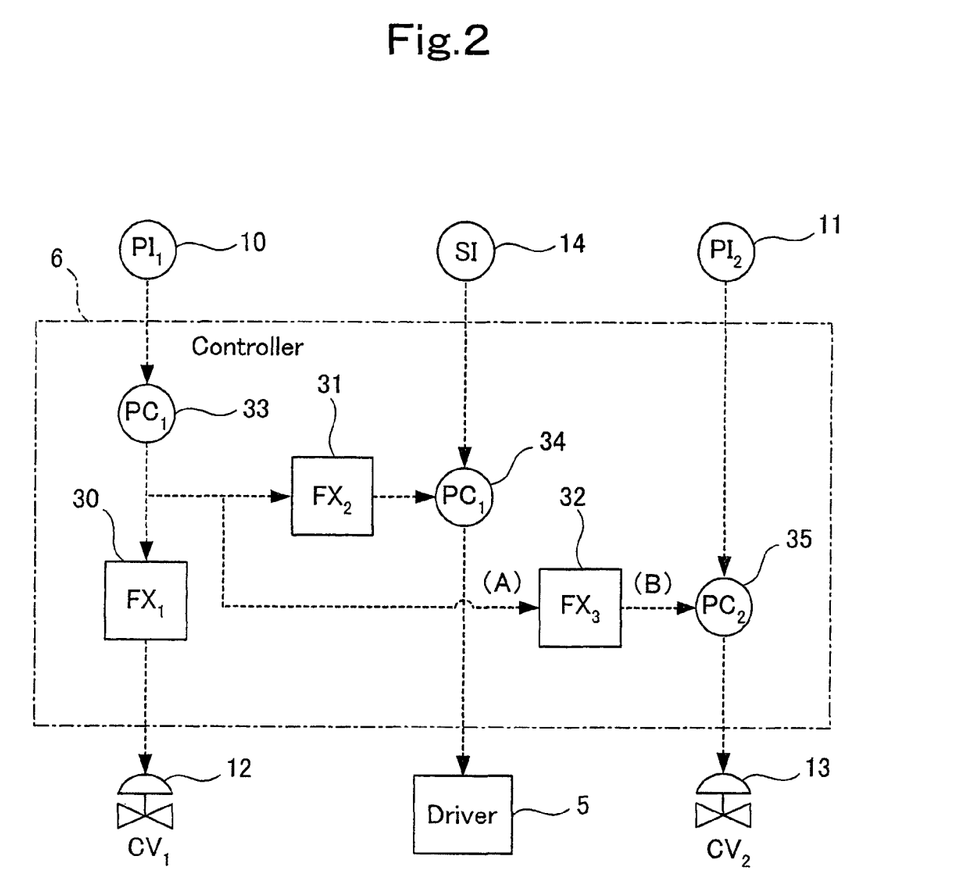
FIG. 2 is a control block diagram of the gas treatment equipment according to the first example of the present invention.

FIG. 2 is a control block diagram of the gas treatment equipment according to the first example of the present invention.

As shown in FIG. 2, the controller 6 of the gas treatment equipment according to this example includes a first pressure control unit ($PC_1$) 33 which outputs a signal depending on the pressure measured by the first pressure indicator 10, a first function generator ($FX_1$) 30 which outputs a signal for controlling the first pressure control valve 12 based on predetermined input-output characteristics upon receipt of the signal from the first pressure control unit 33, a speed control unit (SC) 34 which outputs a signal depending on the rotation speed measured by the speed indicator 14, a second function generator ($FX_2$) 31 which outputs a signal based on predetermined input-output characteristics upon receipt of the signal from the first pressure control unit 33, a second pressure control unit ($PC_2$) 35 which outputs a signal depending on the pressure measured by the second pressure indicator 11, and a third function generator ($FX_3$) 32 which outputs a signal based on predetermined input-output characteristics upon receipt of the signal from the first pressure control unit 33.

Figure 3:
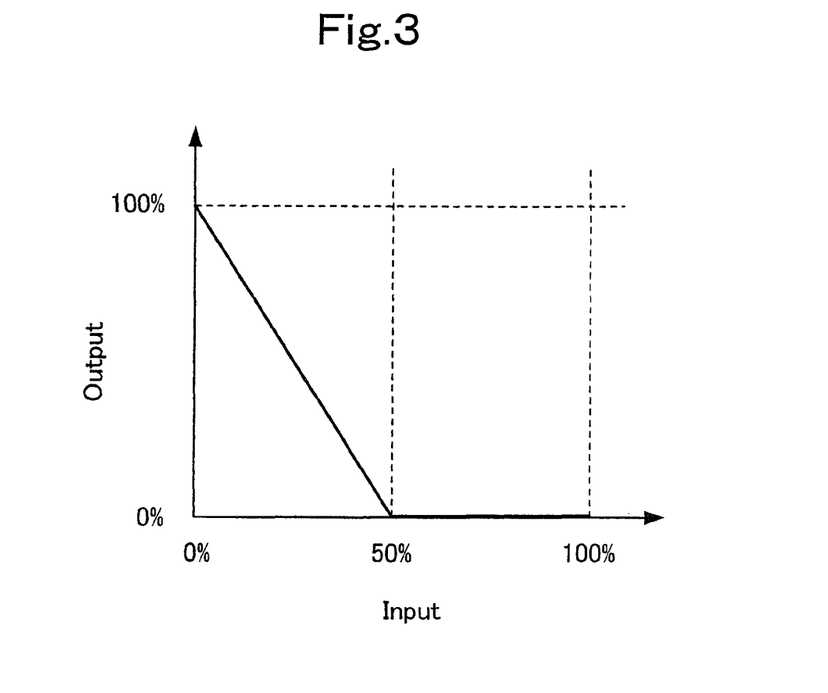
FIG. 3 is a view showing input-output characteristics of a first function generator of the gas treatment equipment according to the first example of the present invention.

FIG. 3 is a view showing input-output characteristics of the first function generator 30 of the gas treatment equipment according to the first example of the present invention.

As shown in FIG. 3, input-output characteristics of the first function generator 30 of the controller 6 according to this example are set as follows with the input being represented in the range of 0% to 100% in accordance with a signal from the first pressure indicator 10: when the input is 0%, the output is set to 100%; when the input is 50%, the output is set to 0%; in the region in which the input is 0% to 50%, the output is decreased linearly; in the region in which the input is 50% to 100%, the output is set to 0%.

Further, the first pressure control valve 12 is controlled based on a signal from the first function generator 30. Thus, the controller 6 according to this example can appropriately regulate the degree of opening of the first pressure control valve 12 in accordance with the pressure measured by the first pressure indicator 10.

Figure 4:
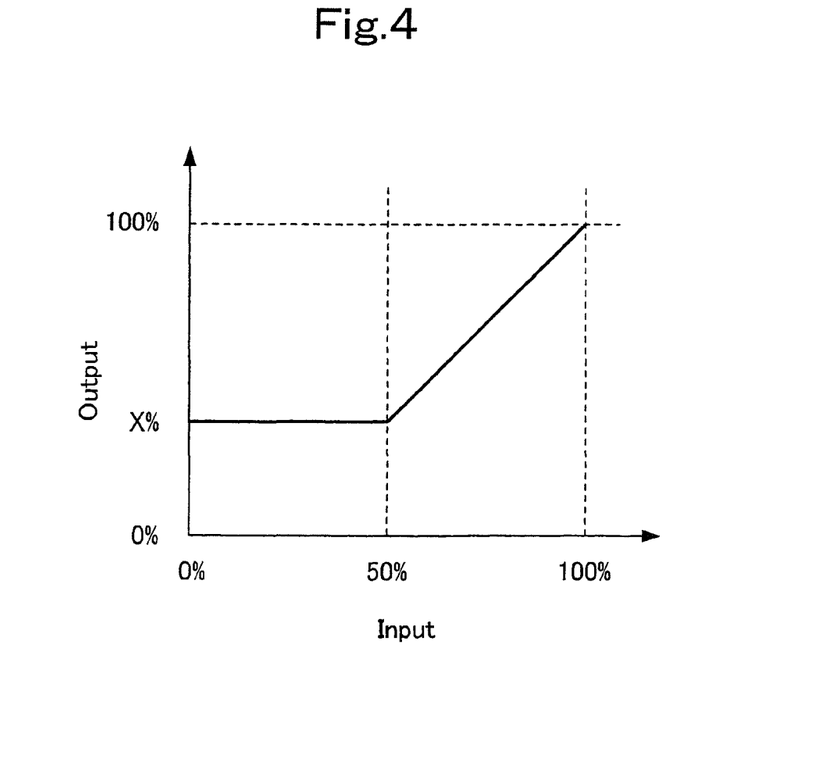
FIG. 4 is a view showing input-output characteristics of a second function generator of the gas treatment equipment according to the first example of the present invention.

FIG. 4 is a view showing input-output characteristics of the second function generator 31 of the gas treatment equipment according to the first example of the present invention.

As shown in FIG. 4, input-output characteristics of the second function generator 31 of the controller 6 according to this example are set as follows with the input being represented in the range of 0% to 100% in accordance with a signal from the first pressure indicator 10: in the region in which the input is 0% to 50%, the output is set to predetermined X %; when the input is 100%, the output is set to 100%; in the region in which the input is 50% to 100%, the output is increased linearly.

Further, the speed control unit 34 controls the driver 5 in accordance with a signal received from the second function generator 31 and a signal received from the speed indicator 14. Thus, the controller 6 according to this example can appropriately regulate the rotation speed of the driver 5 in accordance with the pressure measured by the first pressure indicator 10 and the rotation speed measured by the speed indicator 14.

Figure 5:
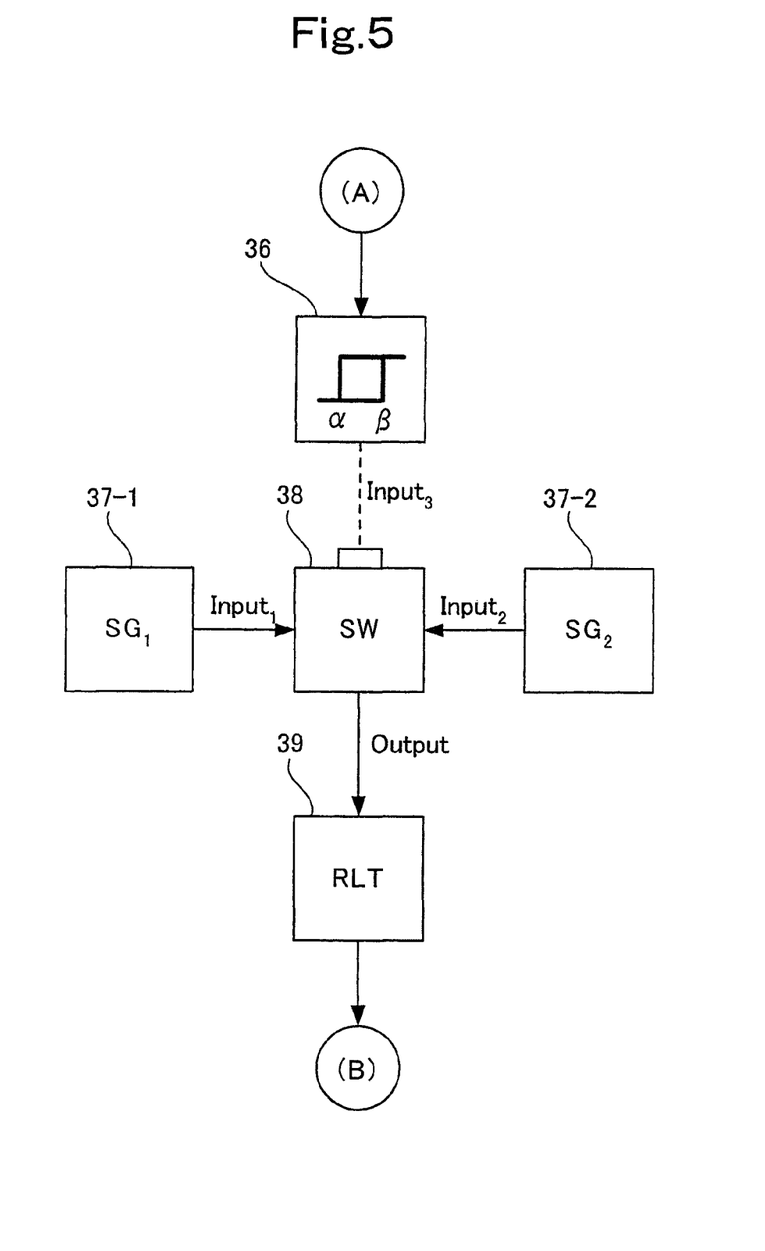
FIG. 5 is a control block diagram of a third function generator of the gas treatment equipment according to the first example of the present invention.

FIG. 5 is a control block diagram of the third function generator 32 of the gas treatment equipment according to the first example of the present invention.

As shown in FIG. 5, the third function generator 32 of the controller 6 according to this example includes a hysteresis element 36 which outputs a signal with a hysteresis upon reception of a signal from the first pressure control unit 33, a first signal generator ($SG_1$) 37-1 which generates a predetermined signal, a second signal generator ($SG_2$) 37-2 which generates a predetermined signal, a switch (SW) 38 which outputs one of an input $Input_1$ from the first signal generator 37-1 and an input $Input_2$ from the second signal generator 37-2 in accordance with an input $Input_3$ from the hysteresis element 36, and a rate limiter (RLT) 39 which imposes a limit on the rate of increase or decrease in the output thereof in accordance with an increase or decrease in an input from the switch 38.

Figure 6:
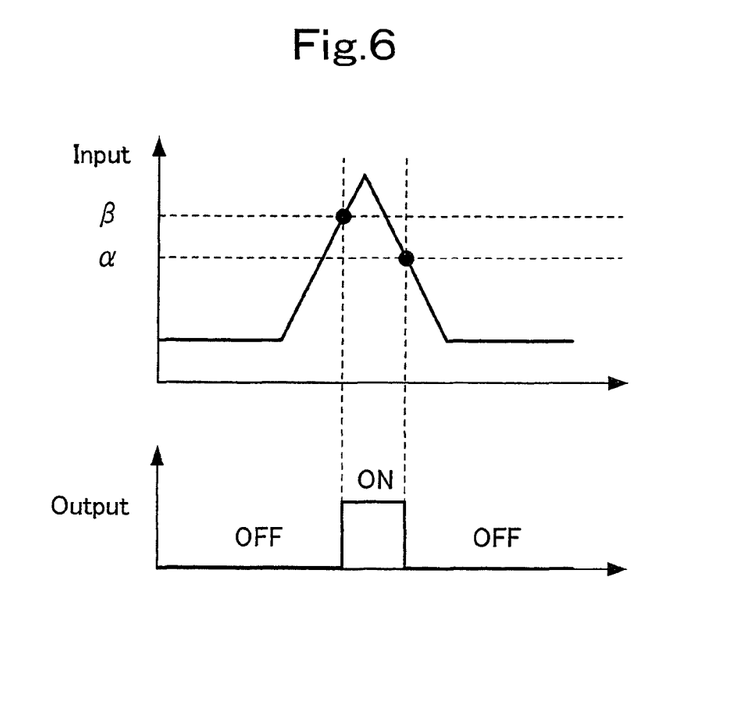
FIG. 6 is a view showing input-output characteristics of a hysteresis element of the third function generator of the gas treatment equipment according to the first example of the present invention.

FIG. 6 is a view showing input-output characteristics of the hysteresis element 36 of the third function generator 32 of the gas treatment equipment according to the first example of the present invention.

As shown in FIG. 6, the hysteresis element 36 of the third function generator 32 according to this example has input-output characteristics depending on a signal from the first pressure control unit 33 as follows: until the input exceeds a threshold β, the output is set to OFF; when the input exceeds the threshold β, the output is set to ON; after that, when the input falls below a threshold α, the output is set to OFF.

Figure 7:
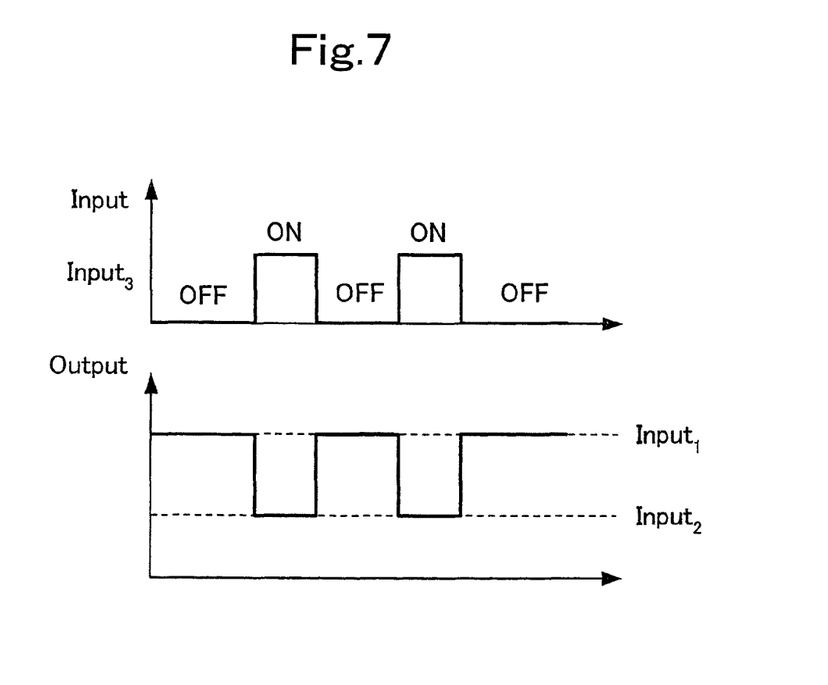
FIG. 7 is a view showing input-output characteristics of a switch of the third function generator of the gas treatment equipment according to the first example of the present invention.

FIG. 7 is a view showing input-output characteristics of the switch 38 of the third function generator 32 of the gas treatment equipment according to the first example of the present invention.

As shown in FIG. 7, the switch 38 of the third function generator 32 according to this example has input-output characteristics depending on a signal from the hysteresis element 36 as follows: when the input $Input_3$ is OFF, the switch 38 outputs the input $Input_1$ from the first signal generator 37-1; when the input $Input_3$ is ON, the switch 38 outputs the input $Input_2$ from the second signal generator 37-2.

Figure 8:
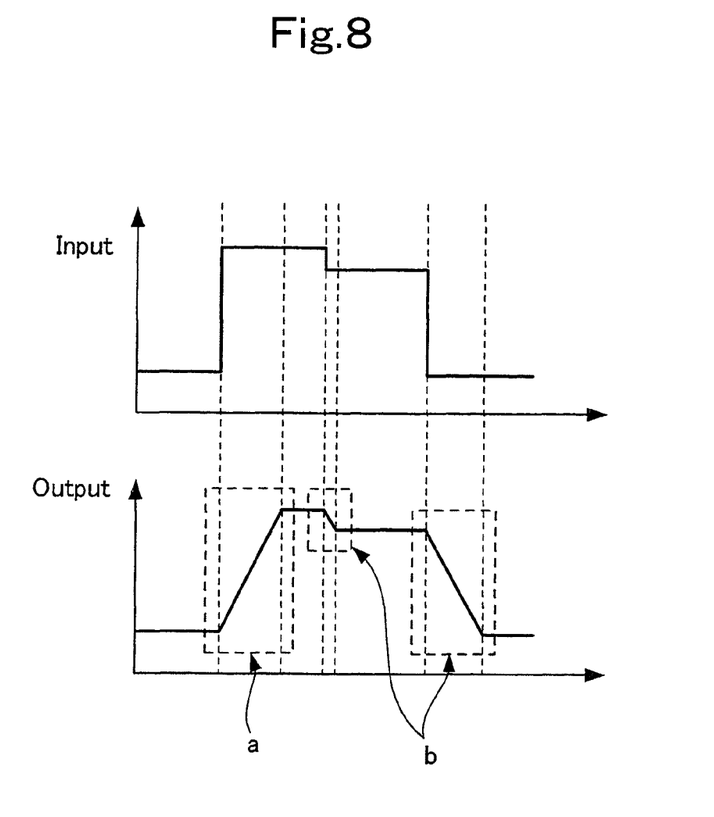
FIG. 8 is a view showing input-output characteristics of a rate limiter of the third function generator of the gas treatment equipment according to the first example of the present invention.

FIG. 8 is a view showing input-output characteristics of the rate limiter 39 of the third function generator 32 of the gas treatment equipment according to the first example of the present invention.

As shown in FIG. 8, the rate limiter 39 of the third function generator 32 according to this example has input-output characteristics depending on a signal from the switch 38 as follows: when the input increases, the rate limiter 39 outputs a signal while imposing a limit on the rate of increase per unit time as indicated by arrow a in FIG. 8; when the input decreases, the rate limiter 39 outputs a signal while imposing a limit on the rate of decrease per unit time as indicated by arrows b in FIG. 8.

FIGS. 9A to 9D are views showing input-output characteristics of the third function generator 32 of the gas treatment equipment according to the first example of the present invention.

Figure 9:
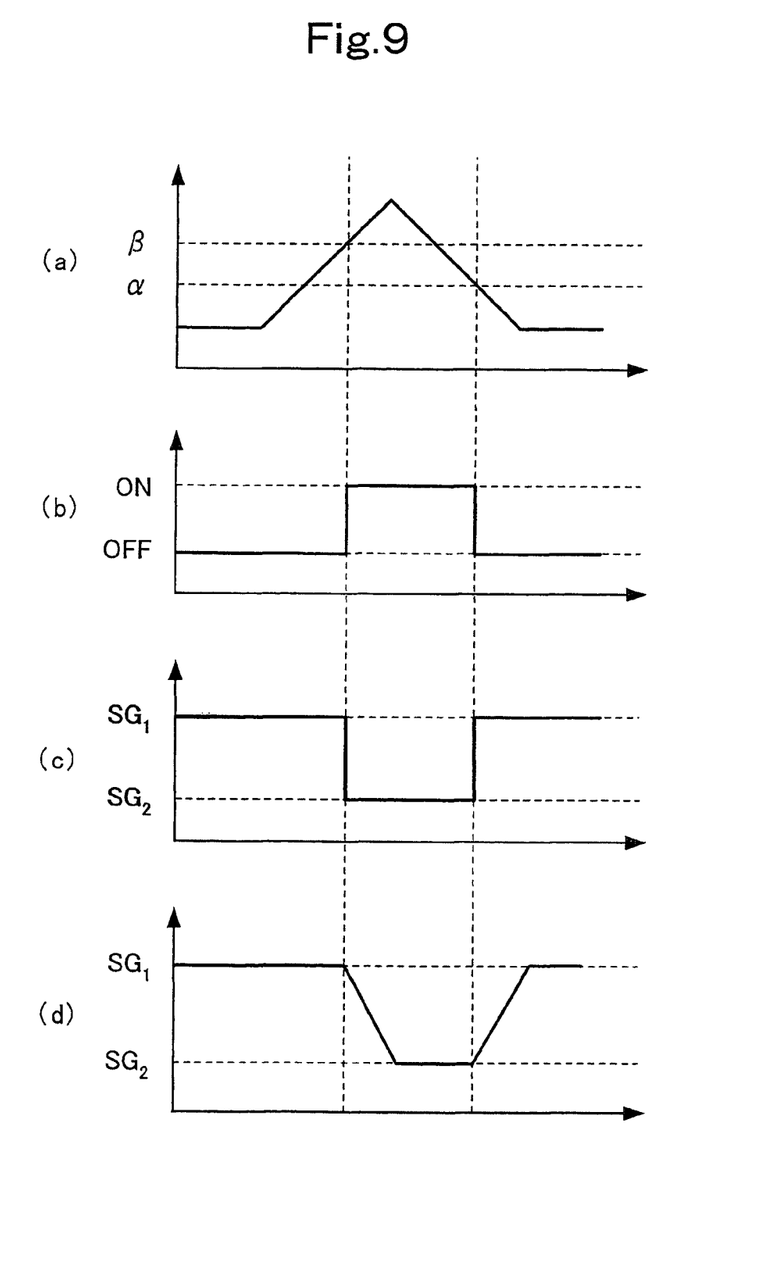
FIGS. 9A to 9D are views showing input-output characteristics of the third function generator of the gas treatment equipment according to the first example of the present invention.

As shown in FIGS. 9A to 9D, in the third function generator 32, the hysteresis element 36 outputs a signal shown in FIG. 9B in response to an input shown in FIG. 9A. The switch 38 outputs a signal shown in FIG. 9C in response to a signal shown in FIG. 9B. The rate limiter 39 outputs a signal shown in FIG. 9D in response to an input shown in FIG. 9C.

Further, the second pressure control unit 35 controls the second pressure control valve 13 in accordance with a signal received from the third function generator 32 and a signal received from the second pressure indicator 11. Thus, the controller 6 according to this example can appropriately regulate the degree of opening of the second pressure control valve 13 in accordance with the pressure measured by the second pressure indicator 11.

As described above, according to the gas treatment equipment of this example, gas treatment equipment can be provided which can be operated regardless of the flow rate of process gas supplied from an upstream facility.

Embodiment 2

Hereinafter, a second example of gas treatment equipment according to the present invention will be described.

The gas treatment equipment according to this example has approximately the same configuration as the gas treatment equipment according to the first example, but is configured to be capable of regulating the pressure at a process gas outlet so that a desired pressure can be obtained at the downstream facility using the treated process gas.

Figure 10:
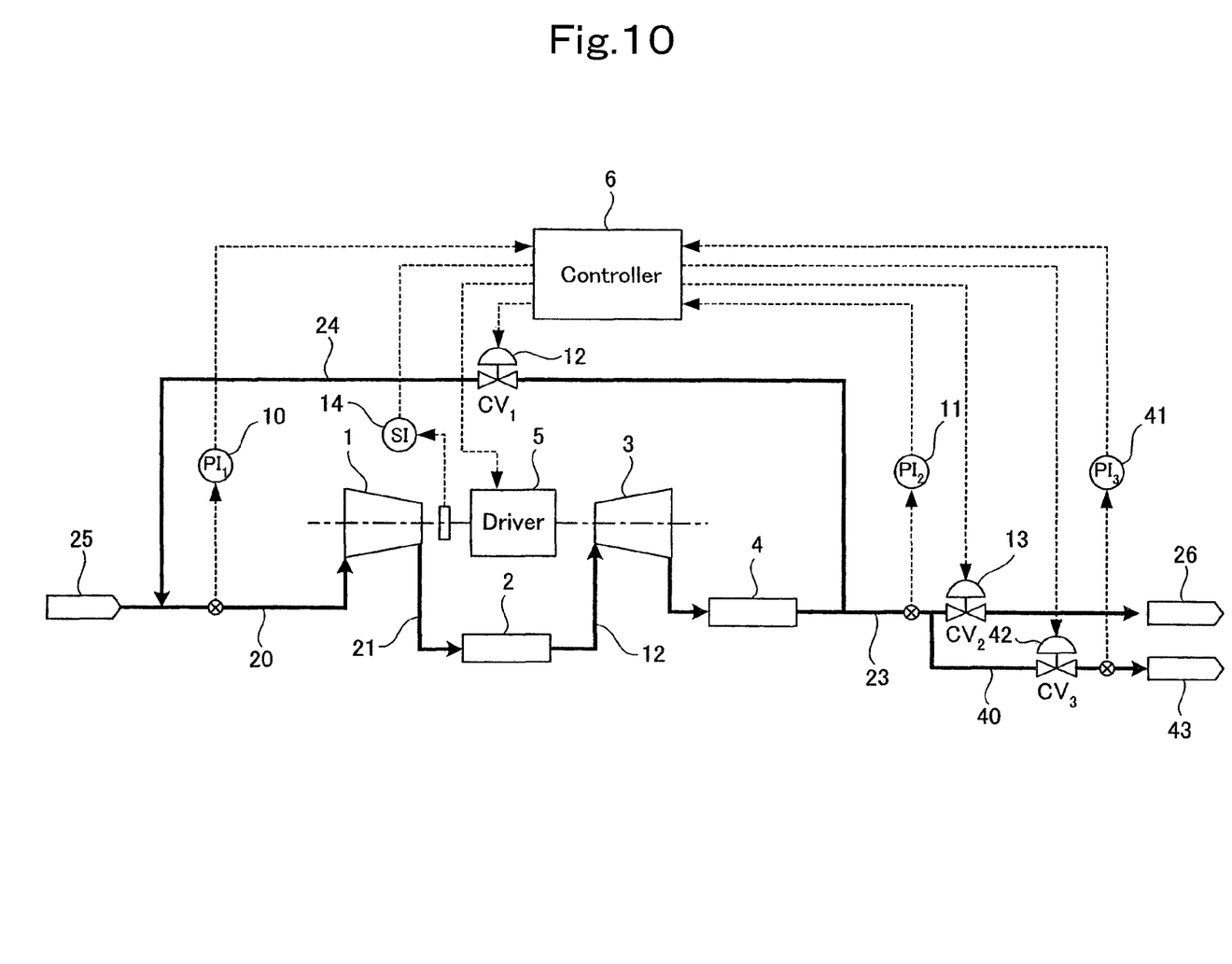
FIG. 10 is a schematic diagram showing the configuration of gas treatment equipment according to a second example of the present invention.

FIG. 10 is a schematic diagram showing the configuration of the gas treatment equipment according to the second example of the present invention.

As shown in FIG. 10, in addition to the configuration of the gas treatment equipment according to the first example, the gas treatment equipment according to this example includes a fifth flow path 40 connected between the second pressure indicator 11 and the second pressure control valve 13. At an end portion of the fifth flow path 40, a second process gas outlet 43 is placed. In the fifth flow path 40, a third pressure indicator ($PI_3$) 41 is placed to measure the pressure of the process gas. Upstream of the third pressure indicator 41 in the fifth flow path 40, a third pressure control valve ($CV_3$) 42 is placed to regulate the pressure of the process gas.

In the gas treatment equipment according to this example, the downstream facility using the treated process gas is connected to the second process gas outlet 43, and the process gas which has flowed out from the first process gas outlet 26 is appropriately treated in accordance with the kind, discharged amount, and the like of the process gas. For example, in the case where the process gas is the mixed gas including nitrogen, hydrogen and carbon dioxide, the process gas is treated by geologic sequestration, atmospheric release, or the like.

Further, in the gas treatment equipment according to this example, the controller 6 controls the third pressure control valve 42 based on the pressure measured by the third pressure indicator 41.

Next, a method of controlling the gas treatment equipment according to this example will be described in detail.

Figure 11:
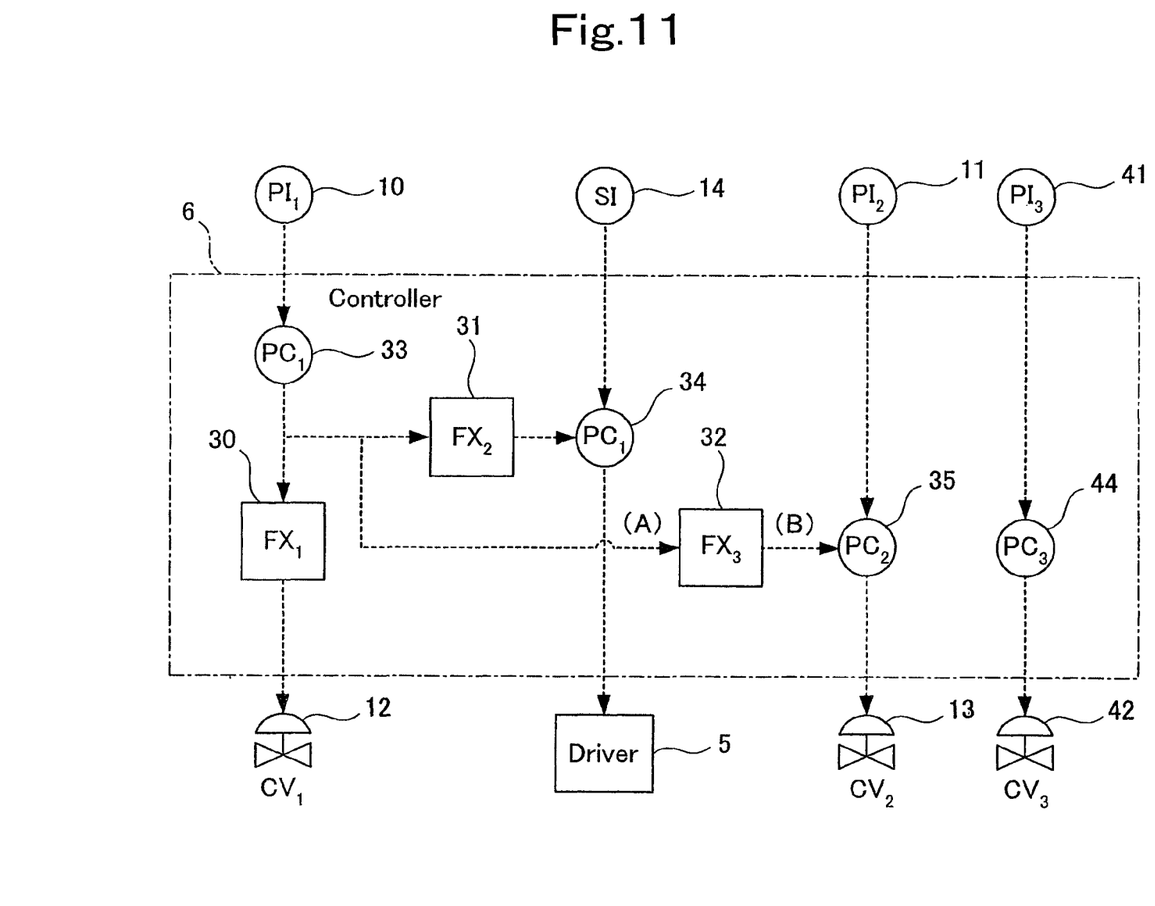
FIG. 11 is a control block diagram of the gas treatment equipment according to the second example of the present invention.

FIG. 11 is a control block diagram of the gas treatment equipment according to the second example of the present invention.

As shown in FIG. 11, in addition to the configuration of the controller 6 of the gas treatment equipment according to the first example, the controller 6 of the gas treatment equipment according to this example includes a third pressure control unit ($PC_3$) 44 which outputs a signal depending on the pressure measured by the third pressure indicator 41.

The third pressure control unit 44 controls the third pressure control valve 42 in accordance with a signal received from the third pressure indicator 41. Thus, the controller 6 according to this example can appropriately regulate the degree of opening of the third pressure control valve 42 in accordance with the pressure measured by the third pressure indicator 41.

As described above, in addition to functions and effects of the gas treatment equipment according to the first example, the gas treatment equipment according to this example can supply the process gas flowing out from the second process gas outlet 43 to the downstream facility while regulating the pressure of the process gas to a pressure desired in the downstream facility.

INDUSTRIAL APPLICABILITY

The present invention can be applied to, for example, gas treatment equipment which includes a recirculation flow path for refrigerant gas and which treats process gas while using the process gas as the refrigerant gas.

DESCRIPTION OF THE NUMERALS

1 COMPRESSOR
2 FIRST PROCESS MODULE
3 EXPANDER
4 SECOND PROCESS MODULE
5 DRIVER
6 CONTROLLER
10 FIRST PRESSURE INDICATOR ($PI_1$)
11 SECOND PRESSURE INDICATOR ($PI_2$)
12 FIRST PRESSURE CONTROL VALVE ($CV_1$)
13 SECOND PRESSURE CONTROL VALVE ($CV_2$)
14 SPEED INDICATOR (SI)
20 FIRST FLOW PATH
21 SECOND FLOW PATH
22 THIRD FLOW PATH
23 FOURTH FLOW PATH
24 RECIRCULATION FLOW PATH
25 PROCESS GAS INLET
26 FIRST PROCESS GAS OUTLET
30 FIRST FUNCTION GENERATOR ($FX_1$)
31 SECOND FUNCTION GENERATOR ($FX_2$)
32 THIRD FUNCTION GENERATOR ($FX_3$)
33 FIRST PRESSURE CONTROL UNIT ($PC_1$)
34 SPEED CONTROL UNIT (SC)
35 SECOND PRESSURE CONTROL UNIT ($PC_2$)
36 HYSTERESIS ELEMENT
37-1 FIRST SIGNAL GENERATOR ($SG_1$)
37-2 SECOND SIGNAL GENERATOR ($SG_2$)
38 SWITCH (SW)
39 RATE LIMITER (RLT)
40 FIFTH FLOW PATH
41 THIRD PRESSURE INDICATOR ($PI_3$)
42 THIRD PRESSURE CONTROL VALVE ($CV_3$)
43 SECOND PROCESS GAS OUTLET
44 THIRD PRESSURE CONTROL UNIT ($PC_3$)

The invention claimed is:

1. Gas treatment equipment comprising:
a compressor which compresses process gas;
a first process module which is disposed downstream of the compressor and which treats the process gas;
an expander which is disposed downstream of the first process module and which expands the process gas to obtain power;
a second process module which is disposed downstream of the expander and which treats the process gas;
a driver which drives the compressor;
a first pressure indicator which is disposed at an inlet of the compressor for the process gas and which measures a pressure of the process gas;
a second pressure indicator which is disposed at an outlet of the second process module for the process gas and which measures a pressure of the process gas;
a recirculation flow path which is connected to both of the outlet of the second process module for the process gas and the inlet of the compressor for the process gas and which recirculates the process gas;
a first pressure control valve which is disposed in the recirculation flow path and which regulates the pressure of the process gas to be recirculated;
a second pressure control valve which is disposed downstream of the second pressure indicator and which regulates the pressure of the process gas;
a speed indicator which measures rotation speed of the driver; and
a controller which controls the rotation speed of the driver and the first and second pressure control valves on the basis of the pressures measured by the first and second pressure indicators and the rotation speed measured by the speed indicator,
wherein the controller further comprises:
(i) a first pressure control unit which outputs a signal depending on the pressure measured by the first pressure indicator;
(ii) a first function generator to which a signal from the first pressure control unit is inputted, which has such input-output characteristics that when the value of the input signal is 0%, the value of the output is set to 100%, when the value of the input signal is 50% or more, the value of the output is set to 0%, and when the value of the input signal is 0% to 50%, the value of the output is decreased linearly, and which controls the first pressure control valve according to an output signal obtained from the input-output characteristics;

(iii) a second function generator to which the signal from the first pressure control unit is inputted, which has such input-output characteristics that when the value of the input signal is 0% to 50%, the value of the output is set to a predetermined x %, when the value of the input signal is 100%, the value of the output is set to 100%, and when the value of the input signal is 50% to 100%, the value of the output is increased linearly, and which outputs a signal obtained from the input-output characteristics;

(iv) a third function generator to which the signal from the first pressure control unit is inputted, which has such input-output characteristics that when the value of the input signal is below a predetermined threshold α, a first signal is outputted, and when the value of the input signal exceeds a threshold β larger than the threshold α, a second signal smaller in value than the first signal is outputted, and which outputs a signal obtained from the input-output characteristics;

(v) a speed control unit which controls the driver in accordance with the signal measured by the speed indicator and the signal outputted from the second function generator; and (vi) a second pressure control unit which controls the second pressure control valve in accordance with the signal measured by the second pressure indicator and the signal outputted from the third function generator.

2. The gas treatment equipment according to claim 1, further comprising:

a process gas outlet flow path which is connected between the outlet of the second process module for the process gas and the second pressure control valve;

a third pressure indicator which is disposed in the process gas outlet flow path and which measures the pressure of the process gas; and a third pressure control valve which is disposed upstream of the third pressure indicator in the process gas outlet flow path and which regulates the pressure of the process gas, wherein the controller comprises a third pressure control unit which controls the third pressure control valve on the basis of the pressure measured by the third pressure indicator.

* * * * *